United States Patent [19]

Imai et al.

[11] 4,319,070

[45] Mar. 9, 1982

[54] CURRENT SUPPLY CABLE FOR A HIGH FREQUENCY HEATING DEVICE

[75] Inventors: Teturo Imai, Numazu; Mitsuru Kobari, Shizuoka, both of Japan

[73] Assignee: Kabushiki Kaisha Meidensha, Japan

[21] Appl. No.: 152,120

[22] Filed: May 21, 1980

[30] Foreign Application Priority Data

May 23, 1979 [JP] Japan .................................. 54-63592

[51] Int. Cl.$^{3}$ ........................ H01B 7/34; H02G 15/02; H05B 6/02

[52] U.S. Cl. .................................. 174/15 WF; 174/19

[58] Field of Search .................. 174/15 C, 15 WF, 19, 174/47, 74 R, 89, 131 R, 131 A, ; 219/137.9; 138/110

[56] References Cited

U.S. PATENT DOCUMENTS

| | | | |
|---|---|---|---|
| 289,381 | 12/1883 | Bodifield et al. | 138/110 |
| 1,140,307 | 5/1915 | Hurley | 138/110 X |
| 1,249,038 | 12/1917 | Dabney | 138/110 |
| 2,759,988 | 8/1956 | Eaton | 174/15 WF X |
| 2,985,708 | 5/1961 | Ross | 174/15 WF X |

FOREIGN PATENT DOCUMENTS

| | | | |
|---|---|---|---|
| 910371 | 1/1946 | France | 174/131 R |
| 943162 | 9/1948 | France | 174/15 C |
| 985794 | 3/1965 | United Kingdom | 174/15 WF |
| 1105906 | 3/1968 | United Kingdom | 174/15 WF |

*Primary Examiner*—Laramie E. Askin

*Attorney, Agent, or Firm*—McGlew and Tuttle

[57] ABSTRACT

The present invention is concerned with an improvement in the structure of a current supply cable which connects a fixed transmitting conductor provided on a high frequency power supply unit to a movable transmitting conductor provided in a heat generating unit in a high frequency heating device, such as high frequency induction heating device, or high frequency induction welding device. The current supply cable comprises, substantially, a member for transmitting a cooling medium such as water, a flexible current conducting member for supplying a high frequency current from a high frequency power supply to a heat generating unit, connecting members for connecting the flexible current conducting member with the high frequency power supply and the heat generating unit, and means for positioning the flexible current conducting member in a predetermined position within the cooling medium transmitting member.

4 Claims, 13 Drawing Figures

CURRENT SUPPLY CABLE FOR A HIGH FREQUENCY HEATING DEVICE

FIELD OF THE INVENTION

The present invention relates to a high frequency heating device, and more particularly to a current supply cable for a high frequency heating device employed in the art of welding and hardening and the like.

BACKGROUND OF THE INVENTION

In recent years, high frequency heating devices have been widely employed in various kinds of industries which require heating sources. Particularly, in the art of welding, hardening and the like, a high frequency current is used to heat a substance to be processed.

Such a high frequency heating device comprises, substantially, a high frequency power supply unit, a heat generating unit for producing the heat by a high frequency current supplied from the high frequency power supply unit, a matching unit for matching the high frequency current supplied from the high frequency power supply to a current to be supplied to the heat generating unit, and a current supply cable for connecting the high frequency power supply unit to the heat generating unit by way of the matching unit.

The current supply cable is a relatively important portion of the high frequency heating device for obtaining high efficiency and good heating characteristics. It is, accordingly, necessary for the current supply cable to be able to pass a current density of 50–100 A/mm$^2$ at a potential of 10–20 KV and a frequency from 10 to several hundred KHz. Moreover, the current supply cable, in order to follow movement of the heat generating member, must be capable of flexing within a range of roughly 50–500 mm in the three directions, vertically, laterally and longitudinally. Furthermore, it is necessary to provide cooling means to prevent overheating of the current supply cable and so forth caused by the skin effect and the proximity effect attendant on high frequency current flows.

FIGS. 1 to 5 show various examples of conventional current supply cables.

The power supply cable 1, shown in FIG. 1, comprises a first conductor in the form of a copper plate 2 having one end fixed to a high frequency power supply unit (not shown in the drawings), a second conductor 3 to be electrically connected to a heat generating unit such as a work coil (not shown in the drawing), a flexible junction cable 4 which is formed by laminating a plurality of relatively thin conductive plates made of copper or an alloy of copper of thickness about 0.2–0.5 mm, a fastening means consisting of a plurality of bolts 5 for connecting the cable 4 to the first conductor 2 and the second conductor 3, and a hose 6 for providing cooling water.

The cable 4 can be bent in many directions, but has the disadvantage of being subjected to damage caused by cracks developed under torion when the second conductor 3 is moved in an oblique direction.

A problem in using such a flexible junction cable 4 is that the flexible junction cable 4 is relatively wide (100 through 600 mm) in proportion to the current capacity and will require extra space for air cooling purposes to prevent the surface of the junction cable 4 from being overheated by the skin effect and proximity effect produced when a high frequency alternating current flows.

There is another problem in a high frequency heating device using the flexible junction cable 4 in that it has been customary to cool part of both the first conductor 2 and the second conductor 3 by means of water (or other cooling medium) fed through the first conductor 2 in order to protect these parts from being overheated through the skin effect and proximity effect produced when high frequency currents flow through such conductors, and thus an additional hose is required in parallel with the flexible junction cable 4 in order to feed water to the second conductor 3, whereby more space is required and the cost increases.

FIGS. 2 and 3 show another example of a prior art current supply cable. The cable shown in FIG. 2 comprises a first conductor in the form of an electric conductive tube 7 having a flange **7*a* at its extreme end portion, a second conductor in the form of an electric conductive tube 8 having a connecting flange 8*a*, and a flexible junction conductor in the form of a corrugated metallic tube 9 having connecting flanges 9*a* and 9*b*. As is shown in FIG. 2, the tube 7 is connected in a liquid-tight fashion to the corrugated tube 9 by the flanges 7*a* and 9*a*, and second metallic tube 8 is also connected to the corrugated metallic tube 9 by the flanges 8*a* and 9*b*** in a liquid-tight fashion.

The corrugated metallic tube 9 in such a construction as shown in FIG. 2 provides a means for passing a cooling medium such as water and electricity simultaneously. The metallic tube 9 is disadvantageously susceptible to damage by cracks developed under torsion in spite of its longer life for unidirectional movement of expansion and contraction.

A problem of the high frequency heating device using such a corrugated metallic tube is its lack of flexibility and limited range of movement necessitating the provision of bendable portions in the flexible corrugated metallic tube, thereby resulting in unnecessary space occupied, a more complex mechanism and larger electrical loss.

Irregular high frequency vibrations due to vortexes in the water passing across the recessed portions of the corrugated metallic tube can cause an accident due to water leakage from a part damaged by fatigue.

The difficulty of manufacturing such a corrugated metallic tube because of its considerably large diameter required to pass high-density currents represents another problem.

There is still another problem in a high frequency heating device using such a corrugated metallic tube.

This problem will be described with reference to FIG. 3. It has been customary to insert the end portion of the corrugated metallic tube 9 into a connecting portion **9*c* of the flange 9*a* and join them with a brazing metal 11. When the corrugated metallic tube 9 is forced to bend, the end portions of the connecting member 10 are subjected to maximum stress so that the breakage of the connecting member 10** tends to start from those portions.

In order to reinforce the junction of the flange and corrugated metallic tube to avoid breakage in the junction, it is possible for the flexible current supply cable to be coated with a braided wire and integrally brazed with the connecting part of the flange. In this case, the braided wire itself will inevitably be cooled by air only.

Therefore, the braided wire may burn out because high frequency alternating currents tend to flow through the skin portion of the braided wire.

Another type of current supply cable whose cross section is shown in FIG. 4 has a stiff sprial copper element 12*a* shaped like a coil spring, a plurality of twisted wires 12 arranged along the circumference of the stiff sprial copper element, a tape 13 wound around the twisted wires for restricting the movement thereof, a rubber sheath 14 covering the tape, and a water passage 15 provided in the central cavity formed by the stiff spiral copper element 12*a*. Such a current supply cable may be used in the case where an alternating current below 10 KHz is used, because such a current has a current density of substantially 10 to 20 A/mm$^2$.

If the frequency rises as high as 400 KHz, however, the alternating current will tend to be deflected into section 16 shown by the hatched lines of FIG. 5 because it is a general practice for two current transmitting passages to be provided in parallel with each other to increase the efficiency of mutual inductance. The extremely high current density of substantially 50 to 100 A/mm$^2$ and the construction of the flexible current supply cable in which the interior is cooled only by a cooling medium such as water can cause overheating in the section of twisted wires followed by lowering the mechanical strength against its bending and finally burning out the current supply cable. Parts in FIG. 5 with functions similar to parts in FIG. 4 are given the same numbers with primes.

There is another problem in a high frequency heating device using such a current supply cable in that in order to prevent the current supply cable from being deformed, the total thickness of the section including the twisted wires and rubber sheath is made large so that the total weight of the current supply cable increases and it becomes impossible to reduce the maximum allowable radius of bending curvature.

SUMMARY OF THE INVENTION

It is an object of the invention to provide a current supply cable for a high frequency heating device which is capable of withstanding voltages in the tens of kilovolts and currents whose densities are substantially within the range of 50 to 100 A/mm$^2$, which is excellent in flexibility and cooling performance, and which requires less space.

BRIEF DESCRIPTION OF THE DRAWINGS

Additional objects and advantages of the present invention will be more readily apparent from the following detailed description of the preferred embodiments thereof when taken together with the accompanying drawings in which.

DESCRIPTION OF THE PREFERRED EMBODIMENTS

Figure 1:
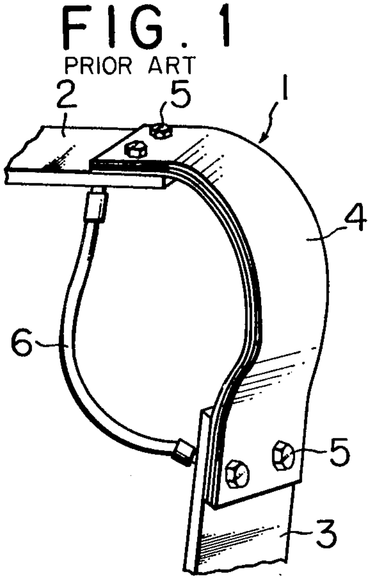
FIG. 1 PRIOR ART
FIG. 1 is a perspective view of a flexible current supply cable in the prior art.
Figure 2:
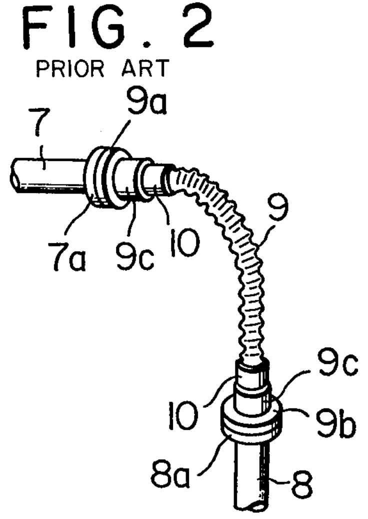
FIG. 2 PRIOR ART
FIG. 2 is a perspective view of another flexible current supply cable in the prior art.
Figure 3:
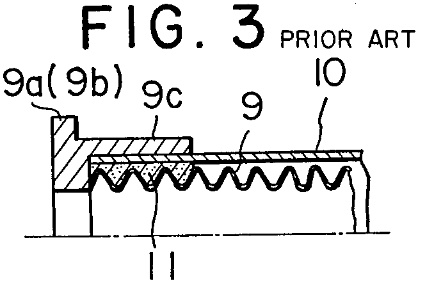
FIG. 3 PRIOR ART
FIG. 3 is a longitudinal section of the prior art flexible current supply shown in FIG. 2.
Figure 4:
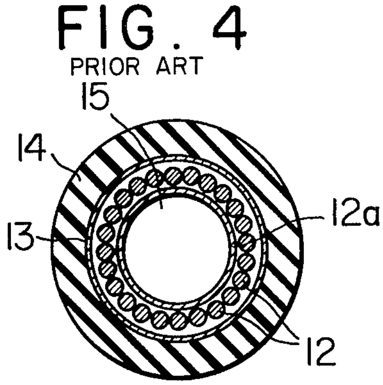
FIG. 4 PRIOR ART
FIG. 4 is a cross sectional view of another flexible current supply cable in the prior art.
Figure 5:
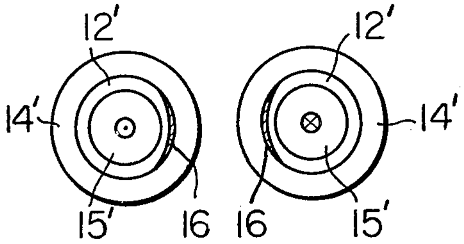
FIG. 5 PRIOR ART
FIG. 5 is a diagrammatic cross sectional view of two parallel cables according to the prior art as heretofore utilized in the high frequency heating device of FIGS. 6 and 7.
Figure 6:
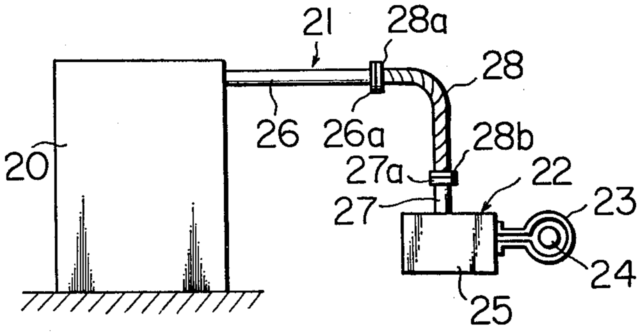
FIG. 6 is a schematic side view of a high frequency heating device.
Figure 7:
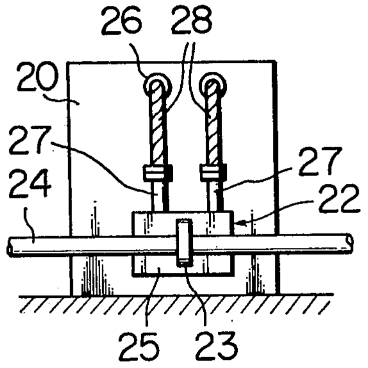
FIG. 7 is a schematic front view of the high frequency heating device shown in FIG. 6.

Referring now to FIGS. 6 and 7, there is shown a greatly simplified high frequency heating device employing a current supply cable in accordance with the present invention.

The high frequency heating device shown comprises, substantially, a high frequency power supply unit 20 for converting a frequency of a commercial power source into a using frequency of the current to be supplied to a heating head 22, a pair of current supply cables 21 for leading a high frequency current from the high frequency power source 20 to a heat generating member in the form of an inductor 23 for heating a workpiece 24.

The high frequency power source includes a high frequency oscillator and is, generally, disposed at a given position. The heating head 22 includes a matching transformer 25 for matching the high frequency current to a current to be supplied to the inductor 23. The heating head 22 is, generally, provided so as to be movable with respect to the workpiece 24. As is shown in FIG. 6, the current supply cable 21 is connected between the high frequency power source 20 and the heating head 22, and is comprised of a first conductor 26, a second conductor 27 and a flexible junction conductor 28.

The first conductor 26 is connected to the high frequency power source 20. The junction flexible conductor 28 is electrically and mechanically connected to the first conductor 26 by means of flanges **26*a* and 28*a*. The second conductor 27 is, also, electrically and mechanically connected to the flexible junction conductor 28 by means of flanges 27*a* and 28*b***.

As in shown in FIG. 7, the pair of first conductors 26 is projected from the high frequency power source 20 horizontally in parallel with each other. The first conductor 26 is made of two copper pipes which can transmit both high frequency currents and a cooling water fed from a pure water circulating device not shown in the drawings.

The heating head 22 comprising a matching transformer 25, an inductor 23, etc., is connected to a pair of second conductors 27 made, for example, of copper pipes in parallel with each other and extending vertically.

Each of the first conductors 26 is connected to each of the second conductors 27 via the flexible junction conductors 28. The heating head 22 is supported to move freely in any direction by means of a transport mechanism which does not appear in the drawings, and the workpiece 24 is fed automatically through a feeder which also does not appear in the drawings.

Figure 8:
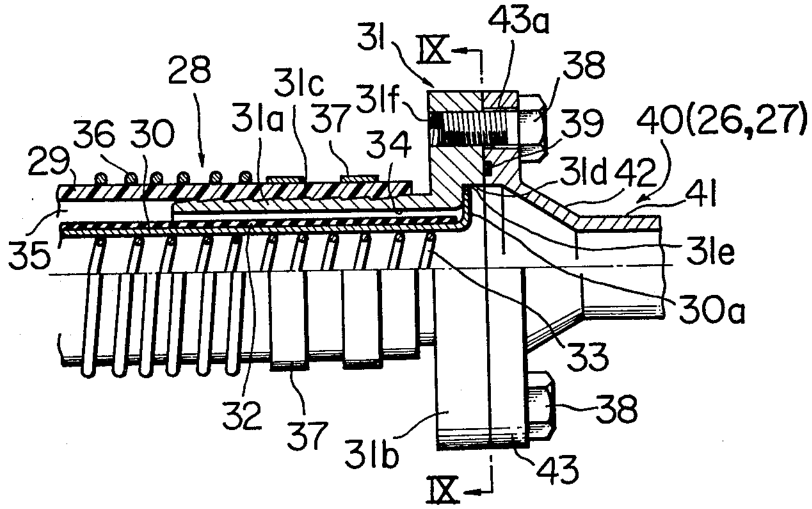
FIG. 8 is a side view, partly in section, of a current supply cable for a high frequency heating device according to the present invention.
Figure 9:
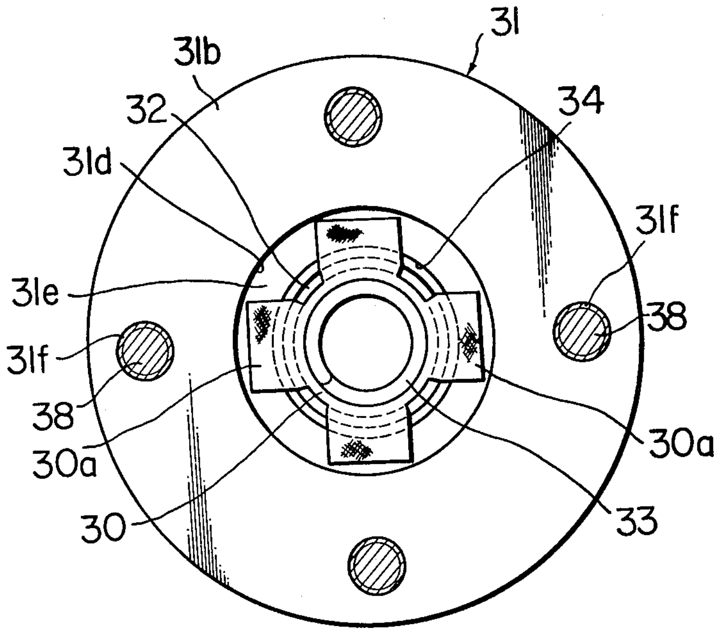
FIG. 9 is a cross sectional view taken on the line IX—IX in FIG. 8.
Figure 10:
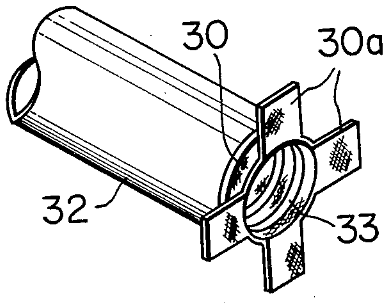
FIG. 10 is a perspective view of the embodiment shown in FIG. 8 in which the hose and connecting member have been removed.

FIGS. 8 to 10 show an embodiment of a current supply cable for a high frequency heating device in accordance with the present invention. The current supply cable comprises, substantially, a cooling medium transmitting member for passing a cooling medium, a flexible current conducting member for supplying a high frequency current from a high frequency power supply to a heat generating unit, connecting members for connecting the cooling medium transmitting member and the flexible current conducting member with the high frequency power supply and the heat generating unit, and positioning means for positioning the flexible current conducting member in a predetermined position within the cooling medium transmitting member.

The cooling medium transmitting member is a flexible hose 29 which is made of insulating material such as a synthetic resin. The flexible current conducting member includes a flexible tubular conductor 30 which is formed by braiding cylindrically conductive wires. Each connecting member includes a metal connecting fixture 31 having a tubular portion 31*a*, a flange portion 31*b*, a plurality of conical portions 31*c* provided on an outer peripheral surface of the tubular portion 31*c* and an annular bore portion 31*d* of larger diameter provided in an inner surface of the flange portion 31*b*. The positioning means comprises a flexible insulating tube 32 which is formed by cylindrically braiding an insulating material such as glass fiber and a supporting member which includes a helical coil 33 made of an insulating heat-resistant material.

The current supply cable further comprises clamping means, such as a clamping band 37, for tightening the insulating flexible hose 29 onto the metal connecting fixture 31 in a fluid-tight manner, a protecting member 36 such as a helical spring, for protecting the insulating flexible hose 29, and fastening means for fastening the connecting member to a current supply conductor member 40 which may correspond to a first conductor 26 or a second conductor 27.

In more detail, an end of the insulating flexible hose 29 is firmly fitted over the outer surface of tubular portion 31*a* of the metal fixture 31.

The outer peripheral surface of the tubular portion 31*a* is provided with a series of tapered annular surfaces or conical portions 31*c* which serve to secure the tight connection of the flexible insulating hose 29 and the connecting metal fixture 31.

As is best shown in FIGS. 9 and 10, four connector terminals 30*a* are formed at an end portion of the flexible tubular conductor 30. The connector terminals 30*a* are firmly secured to a bottom portion 31*e* of the metal fixture 31. The flexible insulating tube 32 has a smaller diameter than that of the metal connecting fixture 31 and is positioned coaxially within the hose 29. Accordingly, an annular space 34 is formed between the inner surface of the tubular portion 31*a* and the outer peripheral surface of the flexible tube 32, and an annular space 35 is also formed between the inner surface of the hose 29 and the outer peripheral surface of the flexible insulating tube 32. The flexible tubular conductor 30 is inserted into the flexible insulating tube 32 to be reinforced and insulated. The helical coil 33 is disposed within the flexible tubular conductor 30 such that the conductor 30 is contacted with the flexible insulating tube 32. The helical coil 33, accordingly ensures that the conductor 30 contacts the inner surface of the insulating tube 32 to form a positioning means together with the insulating tube 32.

A clamping band 37 is disposed around the outer peripheral surface of the flexible hose 29 to form a clamping means together with the series of tapered annular surfaces 31*c* of the fixture 31. The hose is protected by a helical spring 36 made of a synthetic resin such as a hard vinyl. The helical spring 36 is fixed by welding or by a suitable adhesive over the outer surface of the hose 29 along the longitudinal direction. The fastening member includes a plurality of bolts 38 provided on the flange portion 31*b* of the metal fixture 31 spaced equidistantly, as is seen in FIG. 9.

As is shown in FIG. 8, the current supply conductor member 40 is also made of a metallic material such as copper and is constituted by a tubular portion 41, a tapered portion 42 coaxially joined to the tubular portion 41 and a flange portion 43. A plurality of holes 43*a* are provided on the flange portion 43 spaced equidistantly. Furthermore, a plurality of threaded holes 31*f* are also provided in the flange portion 31*b* of the metal connecting fixture 31. A sealing ring 39 is interposed between the flange portion 31*b* of the metal connecting fixture 31 and the flange portion 43 of the current supply conductor member 40.

Figure 11:
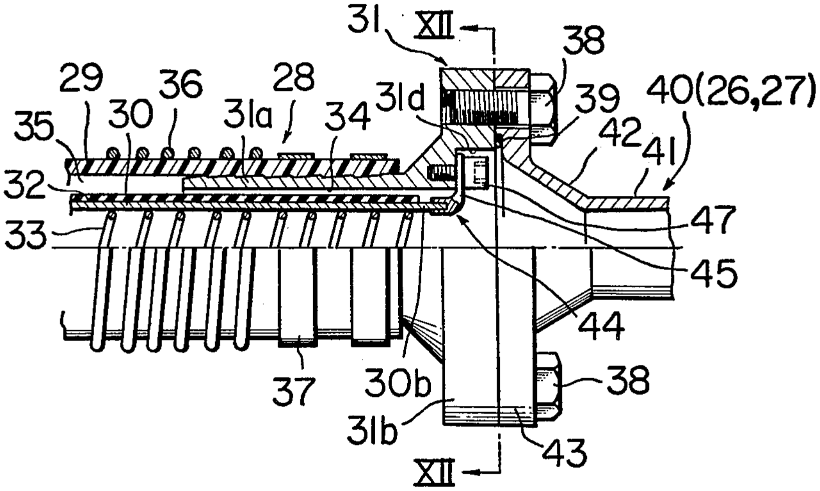
FIG. 11 is a side view, partly in section, of another embodiment of the present invention.
Figure 12:
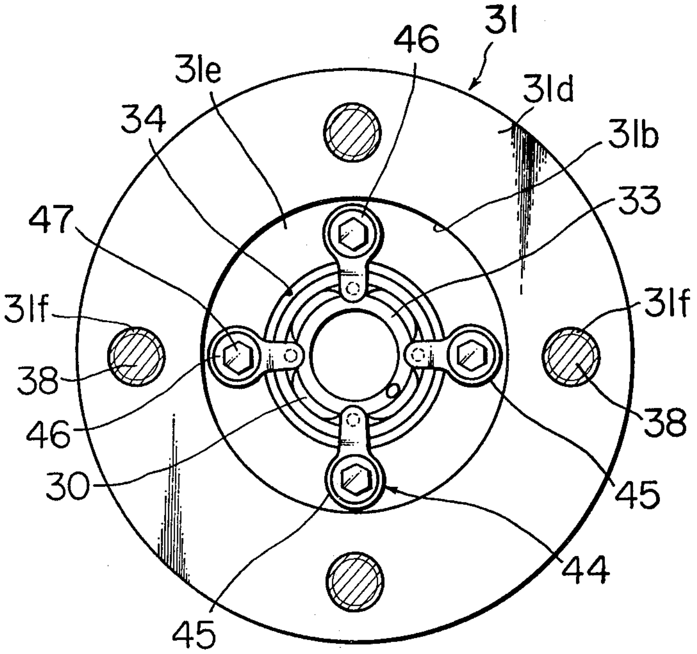
FIG. 12 is a cross sectional view taken on the line XII—XII of FIG. 11.
Figure 13:
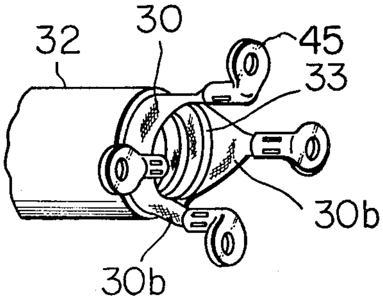
FIG. 13 is a perspective view similar to FIG. 10, of the embodiment of FIG. 11.

FIGS. 11 to 13 show another embodiment of a current supply cable in accordance with the present invention. The current supply cable of this embodiment is similar to the cable of FIGS. 8 to 10, but the difference resides in the provision of connector terminals 44 on the flexible tubular conductor 30. Each connector terminal 44 is provided on a divided portion 30*b* formed by dividing and bundling an end portion of a braided tubular conductor 30.

Each divided portion 30*b* of the briaded tubular conductor 30 is attached to a tag 45 bent in the shape of a letter L. The tag terminal is secured firmly to the indentation of the flange portion 31*b* of the metal fixture by means of a securing means such as a bolt 47 and washer 46.

As set forth above, according to the present invention, the high frequency heating device is provided with the current supply cable located between the high frequency power supply unit and heat generating unit.

The cooling medium transmitting member such as a flexible hose is fitted into the connecting portion of a metal fixture. The flexible current conducting member such as a braided tubular conductor is secured removably to the indentation of the flange portion of the metal fixture or fixedly thereto by means of brazing.

Since the current supply cable described above is several times move flexible than the conventional ones, the cable can be easily bent at the smallest possible radius of curvature. In addition, since the current supply cable is so constructed that the current flows in the cooling water, the braided tubular conductor can be cooled effectively.

In more detail, a heat-resistant, insulating reinforcement shaped like a helical spring is disposed along the inside diameter portion of the braided tubular conductor so that the destruction of the braided conductor can be avoided without sacrifice of flexibility and the smooth stream of cooling water along the inner diameter portion of the braided tubular conductor can be ensured to increase the effect of cooling therealong.

The outer diameter of the braided conductor is designed to provide a clearance between its outer diameter and the inner diameter of the first and second metal fixtures and of the hose so that the entire braided conductor can be more effectively cooled by the cooling water fed along the clearance.

A spacer member in the form of a mesh made of a heat-resistant insulating fabric prevents portions of the braided conductor from coming in direct contact with the inner surface of the hose if part of the braided conductor is deflected toward the surface of the flexible hose.

In addition, the cooling water permeating the spacer member provides a means for protecting the inner surface of the flexible hose from being damaged due to overheating of the braided conductor.

Similarly, even if the outside surface of the braided conductor is brought into contact with the inner peripheral surface of either metal fixture, a by-pass circuit will not be formed, so that high frequency current will not be concentrated at the area of contact and overheating which would damage the area of contact will not occur.

Furthermore, the funnel-shaped construction at the metallic fixture permits an effective dissipation through the cooling water of the heat generated by the contact resistance portion where the end portion of the braided conductor bundled into several pieces is connected to letter L-shaped tags so as not to bring the braided conductor in contact with the inner peripheral surface of the metal fixture.

Still further, the wider gap between each bundled piece of the briaded wire provides an effective means for feeding sufficient amount of water into the gap between the outside surface of the conductor and the inner peripheral surface of the metal fixture.

According to the present invention, the current supply cable provides a means for transmitting high frequency alternating current and feeding the cooling water simultaneously so that the braided conductor can be cooled effectively.

In addition, the current supply cable is compact so as to require less space.

Moreover, the current supply cable is capable of passing high frequency high density currents and withstanding some tens of kilovolts.

What is claimed is:

1. A current supply cable for a high frequency heating device adapted to be disposed between a connecting portion to a high frequency power supply unit and a connecting portion to a heating unit, comprising:

a cooling medium transmitting member formed from a flexible hose of insulating material;

a tubular flexible current conducting member disposed coaxially with and spaced from said cooling medium transmitting member such that an annular space is formed between the inner surface of said cooling medium transmitting member and the outer surface of said flexible current conducting member, which flexible current conducting member comprises a flexible tubular conductor formed of cylindrical braided wires disposed coaxially within said cooling medium transmitting member;

a connecting member mechanically connected at an end of said cooling medium transmitting member in a fluid-tight manner and including a metal fixture having a tubular portion connected to an end portion of said cooling medium transmitting member, a flange portion connected to an end of said tubular portion, and a series of tapered annular surfaces provided on the outer peripheral surface of said tubular portion engaged with an inner surface of said cooling medium transmitting member end portion, said flange portion of said connecting member having an inner end surface facing away from said tubular portion, an end of said tubular flexible current conducting member being fixed to said end surface, said connecting member further including means for fastening said connecting member to a current supply conductor member for conducting a high frequency current from said high frequency power supply unit to said heating unit;

a flexible protecting tube which is constituted by cylindrically braided insulating material provided over the outer peripheral surface of said flexible current conducting member;

a supporting member mounted within said flexible current conducting member for urging said flexible current conducting member into contact with said flexible protecting tube;

means mounted over the outer surface of said cooling medium transmitting member for clamping said cooling medium transmitting member to said connecting member in a fluid-tight manner, said clamping means comprising a clamping band disposed around the outer peripheral surface of said end portion of said cooling medium transmitting member urging said cooling medium transmitting member against said series of tapered annular surfaces provided on the outer peripheral surface of said tubular portion of said connecting member; and a protecting member mounted over the outer surface of said cooling medium transmitting member for protecting said cooling medium transmitting member, said protecting member comprising a helical spring coaxial with and secured to the outer surface of said cooling medium transmitting member.

2. A current supply cable for a high frequency heating device as claimed in claim 1, wherein said tubular flexible current conducting member has a terminal connector secured to said inner end surface of said flange portion of said connecting member.

3. A current supply cable for a high frequency heating device as claimed in claim 2, wherein said terminal connector comprises a plurality of divided portions formed by dividing and bundling an end portion of the braided flexible current conducting member.

4. A current supply cable for a high frequency heating device as claimed in claim 3, wherein said terminal connector further comprises at least one terminal tag connected to one of said divided portions of the braided flexible current conducting member.

* * * * *